United States Patent [19]
Eckardt

[11] Patent Number: 5,667,819
[45] Date of Patent: Sep. 16, 1997

[54] APPARATUS FOR INJECTION MOLDING OF MULTI-LAYER OBJECTS

[75] Inventor: Helmut Eckardt, Meinerzhagen, Germany

[73] Assignee: Battenfeld GmbH, Meinerzhagen, Germany

[21] Appl. No.: 334,287

[22] Filed: Nov. 4, 1994

[30] Foreign Application Priority Data

Nov. 5, 1993 [DE] Germany .......................... 43 37 829.3
Dec. 1, 1993 [DE] Germany .......................... 43 40 990.3

[51] Int. Cl.[6] .................. B29C 45/13; B29C 45/16; B29C 45/20; B29C 45/46
[52] U.S. Cl. .................. 425/130; 425/563; 425/566; 425/568
[58] Field of Search .................. 425/130, 568, 425/573, 563, 564, 566

[56] References Cited

U.S. PATENT DOCUMENTS

| | | | |
|---|---|---|---|
| 3,924,839 | 12/1975 | Millauer | 425/208 |
| 4,444,507 | 4/1984 | Dray | 425/208 |
| 4,582,224 | 4/1986 | Proska et al. | 425/562 |
| 5,125,817 | 6/1992 | Yamachika | 425/130 |
| 5,215,762 | 6/1993 | Eder et al. | 425/130 |
| 5,449,484 | 9/1995 | Gusik et al. | 425/208 |

FOREIGN PATENT DOCUMENTS

| | | |
|---|---|---|
| 1965368 | 7/1970 | Germany . |
| 2045362 | 3/1971 | Germany . |
| 2461925 | 11/1975 | Germany . |
| 232456 | 1/1986 | Germany . |
| 3539088 | 5/1986 | Germany . |
| 3912426 | 6/1992 | Germany . |
| 2013132 | 1/1979 | United Kingdom . |
| 2080187 | 6/1981 | United Kingdom . |
| 9317855 | 9/1993 | WIPO . |

OTHER PUBLICATIONS

Automotive Engineer, 19 (1993), No. 2, pp. 28 to 91.
Helmut Eckardt, Foam Injection Molding Process, Kunststoffberater (Plastic Material Report), 1983, 1/2, pp. 26 to 32.

Primary Examiner—David A. Simmons
Assistant Examiner—Kenneth M. Jones
Attorney, Agent, or Firm—Anderson Kill & Olick P.C.

[57] ABSTRACT

A method of injection molding of workpieces, formed of at least two different layers, and which includes forming at least one layer from lacquer, with the apparatus for effecting the method including at least two injection molding devices for forming melts of lacquer and non-lacquer materials and an injection unit communicating with the two devices for injecting the two melts into a mold cavity of a mold.

2 Claims, 2 Drawing Sheets

APPARATUS FOR INJECTION MOLDING OF MULTI-LAYER OBJECTS

BACKGROUND OF THE INVENTION

The present invention relates to a method of and an apparatus for injection molding objects or workpieces formed at least of two different layers.

The production of multi-layer workpieces or objects, with the layers being formed of different material is well known. E.g., German Patent DE 23 42 794 C3 discloses a method of manufacturing of multi-layer workpieces from thermoplastic materials, which have a foamed core and a non-foamed outer layer or shell. According to the method disclosed in DE 23 42 794 C3, first, a portion of a non-foamed plastic material and then, simultaneously, a foam agent-containing plastic material, together with the remaining portion of the non-foamed material, are injected through a central nozzle and a ring nozzle, which surrounds the central nozzle, into a mold, with the non-foamed plastic material being injected through the central nozzle and the foaming agent-containing plastic material being injected through the ring nozzle. The workpieces formed of a foaming agent-containing plastic material have an advantage over the workpieces formed of a non-foamed, compact material, which consist in that, on one hand, they can be produced irrespective of their wall thickness and, on the other hand, they are much lighter, without the stability or rigidity of workpieces being affected.

German Patent DE 30 25 597 C2 discloses an injection head for injection molding of multi-layer workpieces from two different plastic materials which are fed from two separate injection cylinders into the injection head. The injection head includes a central nozzle extending in an injection direction and a ring nozzle surrounding the central nozzle, with the mouth of the central nozzle, when viewed in the injection direction, being located in front of the mouth of the ring nozzle through which another plastic material is fed. A common, central cylindrical valve body extends in the injection head in the injection direction and is displaced, in the injection direction, by an external drive so that its front end portion is displaced into the mouth of the ring nozzle.

The common valve body serves for closing and opening of the ring nozzle mouth as well as for feeding of a plastic material to the central nozzle.

To solve certain technical problems and, if necessary, to achieve a certain decorative effect, the objects or workpieces are imparted a certain external appearance or particular functional characteristics by appropriate finishing of the outer surface of the objects or workpieces. To this end, the objects or workpieces are often covered with lacquer, which requires a separate operational process and a separate apparatus for effecting lacquering.

German Application DE 24 49 758A discloses a method for producing workpieces from a foaming agent-containing plastic material and which permits to obtain an outer surface having an improved quality. According to the method described in DE 24 49 758A, the plastified plastic material is injected from the nozzle of an extruder into a mold cavity of an appropriate mold against an air or gas cushion, which is retained in the mold cavity under an adjustable pressure and which is forced out of the mold cavity under the counter pressure of the plastic material. However, the objects or workpieces, which are produced by this method, still require finishing lacquering that necessitate an additional flat coating and grinding process.

Finally, German Patent DE 23 46 135 C2 discloses a process of continuous manufacturing of multi-layer workpieces pieces from a plastic material and having a foamed core and an non-foamed outer coating. According to the method described in this patent, the non-foamed plastic material is delivered through a ring nozzle, and the foaming agent-containing plastic material is delivered through a nozzle arranged in the ring nozzle. According to the described process, the foaming agent-containing plastic material is injected into the mold together with a core of a non-foamed plastic material. The process, disclosed in DE 23 46 135 C2, permits to insure, without an increase in the amount of plastic material forming the non-foamer outer coating, that the outer coating has the same thickness over the entire outer surface of the workpiece and does not have any interruption, is continuous over the entire outer surface.

The object of the invention is a method of and an apparatus for producing multi-layer objects or workpieces which permit to simplify the production of such objects and workpieces.

Another object of the invention is a method of and apparatus for producing multi-layer objects or workpieces which permit to substantially improve the quality of the outer surface.

SUMMARY OF THE INVENTION

These and other objects of the invention, which will become apparent hereinafter, are achieved by providing a method of producing multi-layer objects or workpieces and an apparatus for effecting the method which provide for forming at least one outer layer of an object or workpiece, preferably the outer layer, from lacquer. For producing the outer layer, e.g., a plastic material having lacquer characteristics can be used. The injection steps can vary from case to case, e.g., it is possible to first inject the lacquer material into the mold cavity and then the plastic material or, alternatively, to first inject the plastic material and then the lacquer material. For injecting the lacquer material, an injection extruder or another injection molding machine can be used.

A two-layer workpiece having a core and an outer layer can be produced from a plastic core material reinforced, if necessary, with calcium carbonate or glass or carbon fibers, such as thermoplast or hot setting materials, e.g., duroplast or elastomer, and a lacquer material for forming the outer layer. Applicant has found out that an injection molding workpiece with a lacquer outer layer can be produced by an injection molding process. A two-layer injection molding workpiece can be produced by a following injection sequence: coating/core/coating or coating/core, wherein the coating is formed of a lacquer layer and the core is formed of a non-lacquer material, e.g., a plastic material. A three-layer workpiece can be produced in a similar manner, with the core remaining the same. In a three-layer workpiece, a transparent lacquer layer is applied to the first color lacquer layer. The production of the three-layer workpiece is effected in a following sequence:

Outer lacquer layer (e.g. of a transparent lacquer material);
Intermediate lacquer layer;
Inner (core) layer of a plastic material.
Alternatively, the following sequence can be used:
Outer lacquer layer;
Intermediate plastic layer (from reinforced or non-reinforced plastic material); and
Inner (core) plastic layer likewise from reinforced or non-reinforced material.

It is to be pointed out that during the production of both, two-layer and three-layer workpieces, the viscosities of the used materials should be matched, e.g., the viscosity of the outer layer material, i.e., the lacquer material, should be smaller than or the same as the viscosity of the core material.

For manufacturing multi-component, multi-layer, workpieces, by a process, which is based on the process of producing two-layer workpieces, first, lacquer is injected into the molded cavity and then, after intermediate opening of the mold, the lacquer workpiece, which remains in one of the mold halves, is brought into engagement with another cavity, which forms a mold cavity for back-injecting of a plastic material. Alternatively, first, a plastic material and then the lacquer can be injected into the newly formed cavity.

The two-stage injection molding process can be effected, e.g., with a two-mold set consisting of two identical mold halves and two different mold halves, so that, after the injection of a first material, the mold halves are brought into a position for injecting a second material by being rotated or displaced. By using a displacement table, it is possible to effect injection alternatively into two different mold halves, with the injection of lacquer in the first step and the injection of a plastic material in the second step or vice versa. When a two-staged or two-step process is effected with two injection molding machines arranged adjacent to each other, an interposed robot can extract a workpiece from an open mold half of the first machine and put it into a mold half of a second machine. When only a partial lacquering of a workpiece is desired, a composite (combiform) injection molding process can be used. With this process, a mold having a displaceable insert is used, which permits to cover and uncover predetermined areas of the mold.

Finally, for producing lacquer-covered-workpieces, a gas-filled internal pressure process or a combination of a multi-component injection molding process and a gas-filled internal pressure process can be used, wherein a gas is introduced into a mold cavity for producing a lacquer-covered workpiece.

For producing of lacquer-covered workpieces, a thermoplastic lacquer powder can be used. Alternatively, a liquid lacquer can be used. The advantage of using a solid, thermoplastic lacquer powder in comparison with the liquid lacquer, especially when a granulated lacquer is used, consists in that solvents, the handling of which presents an environmental hazard, are dispensed with. The use of a powder coating instead of a solvent coating for metal objects is well known. As a base material for producing a lacquer powder, acrylate, polyester, polyurethane as well as epoxides, epoxy/polyester hybrid can be used. Also can be used such materials as polymerisat, nylon, thermoplastic materials and so on. The use of thermoplastic lacquer powder for coating of can weld joints and, in particular, of the inner layer of containers is disclosed in German publication DE 42 04 266A1. The lacquer powders described in this publication can be used with the process according to the present invention.

According to the present invention, it is contemplated to shear, during the injection, the core material and/or the lacquer material. Shearing favorably influences the plasticizing of the materials in particular of the material of the core which may be formed of a combination of a plastic material with the lacquer.

According to the invention, it is further contemplated to use lacquer materials the hardening of which is favorably influenced by subjecting them to electron or cross-linking irradiation as disclosed in European publication EP 0 297 520B1, which discloses a method of and an apparatus for manufacturing workpieces having an electrically insulated outer surface formed of a lacquer layer which is obtained by an electrical application or by spraying of an appropriate material. According to EP 0 297 520B1, a direct-current crown is applied to a to-be-lacquered outer surfaces.

It can be advantageous to add to the core material and/or the lacquer an additive. As an additive, e.g., a bonding agent can be used. An additive is added to improve the compatibility of the plastic material and the lacquer.

The present invention also contemplates the use of a foaming-agent-containing plastic material.

The apparatus according to the present invention for effecting the inventive process comprises a main injection molding assembly including an injection unit connectable with an appropriate mold. The apparatus for effecting the inventive process is similar to known injection-molding machines for manufacturing multi-component injection-molded workpieces, e.g., two-or-three-channel injection molding machines. Such machines comprise two plastification and injecting devices, with the control of temperature, plasticization process and injection of each machine being effected independently from the control of another machine. Both injection molding devices are connected with each other by a common nozzle. Alternatively, as a common nozzle, a sprue can be used. The multi-layer workpieces, which are produced with a known two-channel or multi-component injection molding process, have always three layer, i.e., outer layer/core/outer layer, from side-to-side.

It is also possible to produce, with a two-stage injection molding process multi-layer workpieces not all of outer surfaces of which have an outer layer or coating.

Generally, it is desirable to provide an outer coating on all of the surfaces of the core. Thus, when a three-channel injection molding process is used, altogether three different materials are injected into a mold, and a finished workpiece has an inner core, which is covered from all sides with an intermediate material which, in turn, is covered, likewise from all sides, with a coating material. When a two-channel injection molding process is used, first, a predetermined amount of a coating material is injected into a mold, then coating and core materials are injected together. In this case, the later injection phase may be shorter or longer and is calculated to provide a uniform coating of the core material with the coating material, without any transitional regions. Finally, the mold cavity is completely filled with core material, which may be compact or may include a foaming agent, dependent on the required wall thickness and the intended use of the injection molded workpiece.

When a three-channel injection molding process is used, the injection sequence may be the same, with the three different materials being injected in the following sequence; coating material, intermediate material and the core material.

For producing multi-component, i.e., multi-layer workpieces a so-called mono-sandwich technology can be used, according to which, two melts are first collected in a common injection cylinder one after another, and then injected into a mold cavity of a mold with a single stroke. At that, in accordance with the flow characteristics, first, the melt, which is located in front of the cylinder, flows into the mold cavity and then the melt, which located behind, flows into the mold cavity. With this process, a two-component workpiece, the outer layer or coating of which is formed of lacquer, is produced when one of the streams contains lacquer, in particular, thermoplastic lacquer powder.

As it has already been mentioned above, the present invention contemplates providing, in the feed channels, provided in the injection unit, and/or in the nozzle channels, of shearing gaps. As it has also been already mentioned, such gaps favorably influence the plastification of the injectable plastic materials. This also provides for adjustment of the nozzle channels of the injection nozzle in accordance with the flow in the respective feed channels. The shearing is effected during the injection process.

When a mold advantageously is provided with an overflow channel, which can be adjustable or non-adjustable, then additional cavities can be obtained. With this it is achieved, that a core material can reach a location, which it could not reach previously, by being forced out to that location by a surplus coating material.

The present invention contemplates providing a dip injection mold, that is a mold the cavity volume of which is reduced to a small value, with the injection being effected only into that small volume. First, the mold cavity volume is increased to a volume corresponding to complete filling of the volume cavity, e.g., by withdrawing of the core material. If the core material contains, e.g., at a two-channel injection molding process, a foaming agent, then the outer contour of a workpiece is expanded, by the foaming agent, to the mold cavity contour, i.e. the workpiece has a contour that is larger than the initial value and, as a result of the expansion of the foaming agent, an inner foamed core is formed.

The dip injection mold can be combined with an embossing process, during which after the injection of the plastic material, the mold is open, and an amount of lacquer, corresponding to the desired volume, is injected. Thereafter, the mold is closed, and due to embossing, as a result of applied pressure, a uniform distribution of the lacquer over the entire outer surface of the core takes place. This process insures obtaining of a very thin lacquer layer.

The dip molding mold can be modified by the sealing of the mold cavity and by application, before the injection of a melt, of counter pressure. The counter pressure created in the mold cavity should be bigger than the pressure of the foaming agent in the melt in order to prevent, during the filling of the mold cavity, the volume of which is to be subsequently reduced, foaming of the foaming agent. Only after the filling of the mold and its subsequent opening, the foaming agent expands and fills the mold cavity. It should be pointed out that when lacquer is used with the use of a foamed plastic material and a dip molding mold, the counter pressure is not absolutely necessary for obtaining a quality outer surface of an injection molded article. The lacquer material itself envelops the foaming agent-containing melt and prevents the expansion of the foamed core material. By applying a counter pressure, which can be used not only with a dip molding mold but also with a conventional mold, it can be achieved that the air or gas pressure of the flow front of the melt acts as a counter pressure. Thus, the expansion of the core material, in particular, when a foaming agent-containing material is used, will be prevented by the flow front as the material is unable to break through the flow front.

According to the invention, the injection unit comprises an injection nozzle with injection needles extending from the front. In opposition to a conventional nozzle head, in which both injection needles for the coating and core materials extend only to the back, in the direction to the hydraulic unit, providing injection needles extending from the front substantially facilitate the assembly of the nozzle. This structure also substantially facilitate cleaning of the nozzle.

According to the invention, it is contemplated to provide rapid action coupling for connecting the injection needles with the hydraulic unit.

The disassembly of the injection unit is simple. After the nozzle head is unscrewed from the nozzle body, a free access to the injection needles is insured, and after release of the couplings (claw couplings, screw couplings), the outer needle can be pulled forward and then the inner needle can be removed.

For producing multi-component workpieces having a lacquer outer layer according to the invention, the per se known mold nozzles can be used as the injection nozzle. For example, three separate material feed elements with a common closing mechanism, such as described in DE 22 47 995 C2 and DE 23 46 135 C2, can be used.

BRIEF DESCRIPTION OF THE DRAWINGS

The features and objects of the present invention will become more apparent and the invention itself will be best understood from the following detailed description of the preferred embodiment when read with reference to the accompanying drawings, wherein.

DETAILED DESCRIPTION OF THE PREFERRED EMBODIMENTS

Figure 1:
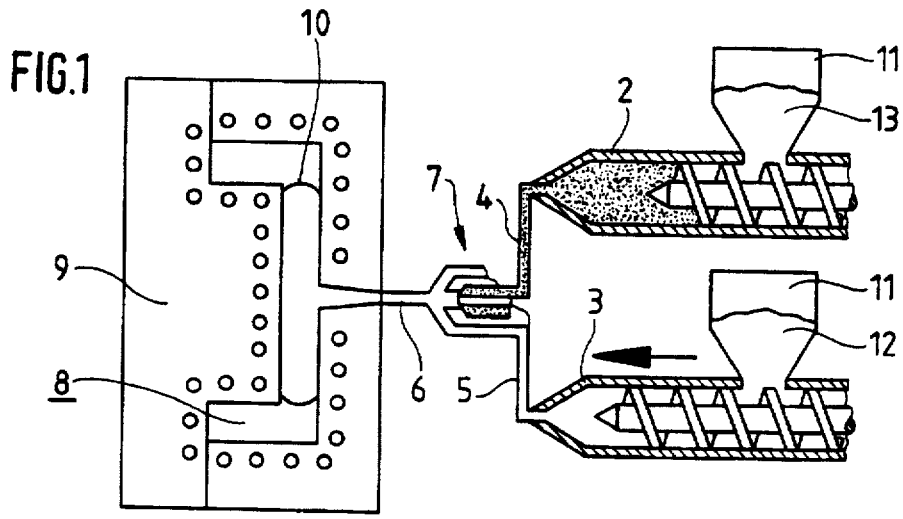
FIG. 1 is a schematic view showing a first phase of the process of manufacturing multi-component workpieces according to the present invention.

An injection molding machine for producing a two-component workpiece 1 and which is not shown in the attached drawings in its entirety, includes two injection devices 2 and 3 which are connected by two feed channels 4 and 5, respectively, to a common injection unit 7, which is provided outside of a mold body and which includes an injection nozzle 6. The injection nozzle mouth opens into a mold cavity 8 of a mold 9. For producing the two-component, e.g., two-layer workpiece 1 having an outer, e.g., lacquer layer 10, a metering device 11 of the injection device 3 is filled with a thermoplastic coating powder 12 which is plastified in the injection device 3 and is fed, in a form of a melt, through the feed channel 5 into the injection unit 7. From the injection head 7, the lacquer melt is injected, through the nozzle 6, in the mold cavity 8 of the mold 9, and an outer layer 10 starts to form in mold cavity 8. This step or phase of the injection molding process of producing a two-layer workpiece 1 is illustrated in FIG. 1. During this phase, the plastic material 13 for obtaining a base or core layer 14 and which fills the metering device 11 of the injection device 2, remains at rest.

Figure 2:
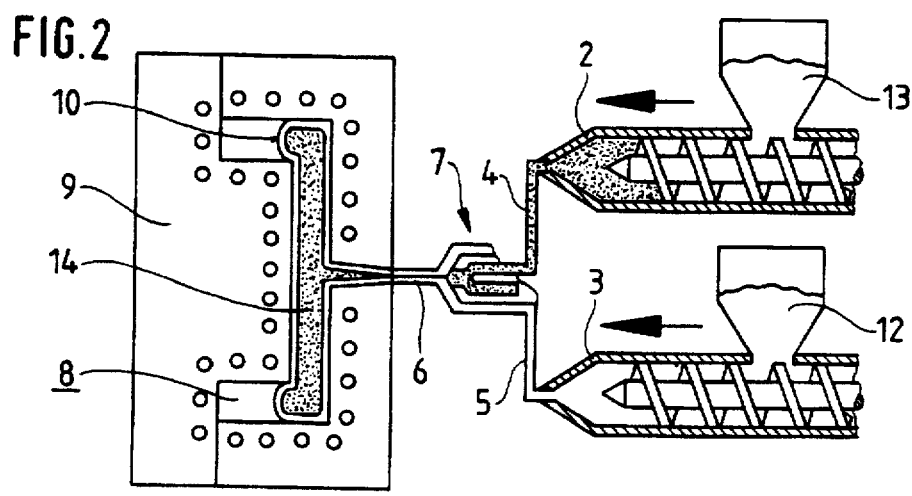
FIG. 2 is a schematic view showing a second phase of the inventive process.

Immediately after the injection of the lacquer 12 starts, after more or less long transitional phase, the injection of both the lacquer powder 12 and the plastic material 14 is being effected, i.e., both injection devices 2 and 3 become operational, as it is made clear by arrows in FIG. 2 indicating the operational condition of both injection devices 2 and 3, whereas an arrow in FIG. 1 indicates that only the injection device 3 is operational. In the drawing figures, the flow of the plastic material 13 for producing the core layer 14 is shown by dots to distinguish it from the flow of the lacquer material 12. The phase of simultaneous injection of the lacquer and plastic material melts can be longer or shorter and, in any case, should be such that the change-over from the coating material to the base (core) material is effected with a transitional period as small as possible.

Figure 3:
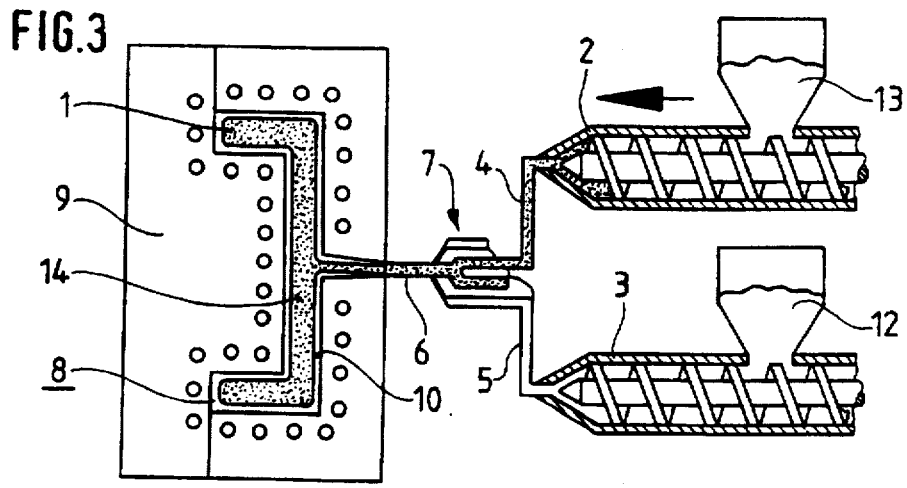
FIG. 3 is a schematic view showing a third phase of the inventive process.

FIG. 3 illustrates the last operational phase of the process of producing a two-component, two-layer, workpiece during which only the plastic material 13 is being injected, as it is indicated by the arrow. The injection of the plastic material during the third phase is effected until the cavity 8 of the mold 9 is completely filled with the plastic (core) material. After the workpiece 1 is solidified, the mold is open by separating the two halves of the mold, and the workpiece 1 is removed. Generally, for producing a multi-two-component workpiece 1, two single injection molding processes and two injection molding machines are combined, and the multi-injection nozzle 6 is formed of two separate nozzles.

Figure 4:
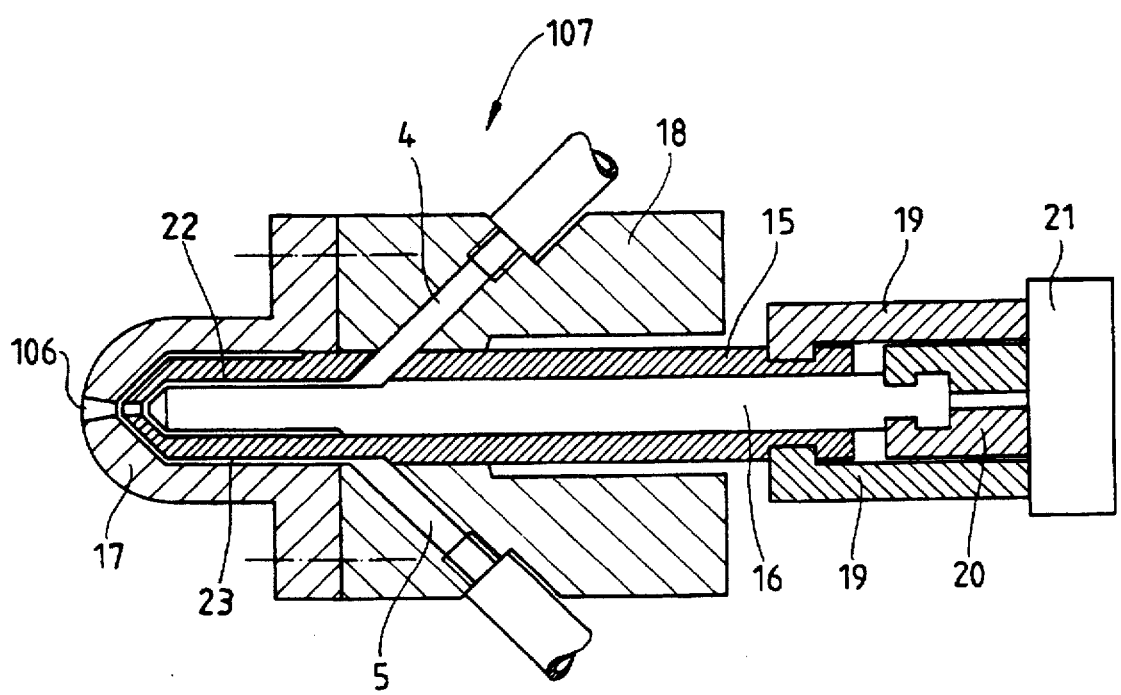
FIG. 4 is a cross-sectional schematic view of the nozzle unit according to the present invention.

An injection unit suitable for producing a multi-component workpiece is shown in more detail in FIG. 4. In FIG. 4, the injection unit 107 has two extending from its rear portion injection needles 15 and 16 connected to a common nozzle mouth of an injection nozzle 106. At that, easy cleaning or exchange of the nozzle insert of the injection nozzle 106 is possible, without a need to disassembly the injection unit. To this end, it is sufficient to unscrew the nozzle head portion 17 from the nozzle body 18, and the injection needles become easily accessible. Both the outer and inner injection needles 15 and 16 are connected, by respective rapid action couplings 19 and 20, to a hydraulic device 21, shown schematically, which actuates the two injection needles. To separate the nozzle 106 from the injection unit 107, it is sufficient to release the two couplings 19 and 20. Then, the outer injection needle 15, together with the inner injection needle 16 can be easily removed from the nozzle body 18. Finally, the injection needle 16 can be removed from the outer needle 15.

The outer and inner needles define a first channel 22 for feeding, to the nozzle mouth, a first component delivered through the feed channel 4, and the outer needle 15 and the cap 17 form a second channel 23 for feeding to the nozzle mouth a second component delivered through the feeding channel 5.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An apparatus for injection molding of workpieces formed of at least two different layers, said apparatus comprising:

a mold;

injection molding means for forming melts of two different materials which form the at least two different layers;

an injection unit for injecting the melts of the two different materials into the mold; and at least two channels for connecting the injection molding means with the injection unit for feeding the melts of the two different materials produced in the injection molding means to the injection unit, wherein the injection unit comprises an injection nozzle having a nozzle body and a nozzle head portion releasably attachable to the nozzle body and defining a nozzle mouth, and outer and inner needles arranged concentrically with each other and extending through the nozzle body, wherein a first channel for conducting the melt of one of the two different materials to the nozzle mouth is formed between the inner and outer needles, and a second channel for conducting the melt of another of the two different materials to the nozzle mouth is formed between the outer needle and the nozzle head portion, and wherein shearing gaps are provided in at least one of the feeding channels.

2. An apparatus for injection molding of workpieces formed of at least two different layers, said apparatus comprising:

a mold;

injection molding means for forming melts of two different materials which form the at least two different layers;

an injection unit for injecting the melts of the two different materials into the mold; and at least two channels for connecting the injection molding means with the injection unit for feeding the melts of the two different materials produced in the injection molding means to the injection unit, wherein the injection unit comprises an injection nozzle having a nozzle body and a nozzle head portion releasably attachable to the nozzle body and defining a nozzle mouth, and outer and inner needles arranged concentrically with each other and extending through the nozzle body, wherein a first channel for conducting the melt of one of the two different materials to the nozzle mouth is formed between the inner and outer needles, and a second channel for conducting the melt of another of the two different materials to the nozzle mouth is formed between the outer needle and the nozzle head portion, and wherein shearing gaps are provided in at least one of the first and second channels.

* * * * *